US012592014B2

(12) United States Patent
Wan et al.

(10) Patent No.: US 12,592,014 B2
(45) Date of Patent: Mar. 31, 2026

(54) MEDIA CONTENT PROCESSING METHOD AND APPARATUS, DEVICE, AND STORAGE MEDIUM

(71) Applicant: Beijing Zitiao Network Technology Co., Ltd., Beijing (CN)

(72) Inventors: Shiqi Wan, Beijing (CN); Siqi Shu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/976,131

(22) Filed: Dec. 10, 2024

(65) Prior Publication Data

US 2025/0104317 A1 Mar. 27, 2025

Related U.S. Application Data

(63) Continuation of application No. PCT/CN2023/112878, filed on Aug. 14, 2023.

(30) Foreign Application Priority Data

Aug. 15, 2022 (CN) .......................... 202210977422.9

(51) Int. Cl.
*G06T 11/60* (2006.01)

(52) U.S. Cl.
CPC .......... *G06T 11/60* (2013.01); *G06T 2200/24* (2013.01)

(58) Field of Classification Search
None
See application file for complete search history.

(56) References Cited

U.S. PATENT DOCUMENTS

| | | | | | |
|---|---|---|---|---|---|
| 11,568,131 | B1 * | 1/2023 | Cundall | .............. | G06F 3/04842 |
| 11,995,757 | B2 * | 5/2024 | Kwong | ................ | G06T 11/203 |
| 12,170,834 | B2 * | 12/2024 | Van Os | ................... | H04L 51/10 |
| 2015/0110471 | A1 | 4/2015 | Zheng | | |

(Continued)

FOREIGN PATENT DOCUMENTS

| | | |
|---|---|---|
| CN | 102870081 A | 1/2013 |
| CN | 104333688 A | 2/2015 |

(Continued)

OTHER PUBLICATIONS

International Search Report and Written Opinion for PCT/CN2023/112878, mailed on Nov. 8, 2023, 13 pages.

(Continued)

*Primary Examiner* — Toan H Vu
(74) *Attorney, Agent, or Firm* — Astute IP Law Group

(57) ABSTRACT

Embodiments of the present disclosure disclose a media content processing method and apparatus, a device, and a storage medium. The method includes: displaying media content of a target media work on a preset page of a current application, wherein the media content includes a picture and/or a video; determining at least one target media content from the media content; and in response to an emoji object generation instruction for the at least one target media content, generating at least one target emoji object according to the target media content, wherein the at least one target emoji object is configured in an emoji selection interface of the current application.

20 Claims, 6 Drawing Sheets

(56) References Cited

U.S. PATENT DOCUMENTS

| | | | | |
|---|---|---|---|---|
| 2017/0091534 A1* | 3/2017 | Venkataraman | .... | G06F 16/9535 |
| 2017/0358010 A1* | 12/2017 | Montaque | .......... | G06Q 30/0275 |
| 2017/0364599 A1* | 12/2017 | Ohanyerenwa | ......... | G06F 16/48 |
| 2019/0018577 A1* | 1/2019 | Liu | ..................... | G06F 3/04845 |
| 2020/0073485 A1* | 3/2020 | Al-Halah | ............ | G06F 16/5846 |
| 2020/0106965 A1* | 4/2020 | Malia | .................... | G11B 27/34 |
| 2021/0258511 A1* | 8/2021 | Goodrich | ................ | H04L 51/10 |
| 2021/0342020 A1* | 11/2021 | Jorasch | ................... | G06F 3/011 |
| 2022/0319064 A1* | 10/2022 | Yeh | ......................... | G06T 11/60 |
| 2022/0343569 A1* | 10/2022 | Karri | ..................... | G06F 40/129 |
| 2023/0070631 A1* | 3/2023 | Berger | ................. | G06V 40/168 |
| 2023/0136013 A1* | 5/2023 | Goodrich | ................ | G06T 11/60 |
| | | | | 345/419 |
| 2023/0161809 A1* | 5/2023 | Armstrong | ........... | G06F 16/532 |
| | | | | 707/769 |
| 2023/0393659 A1* | 12/2023 | Walton | ................... | G06T 11/00 |

FOREIGN PATENT DOCUMENTS

| | | |
|---|---|---|
| CN | 107370887 A | 11/2017 |
| CN | 109120866 A | 1/2019 |
| CN | 109215007 A | 1/2019 |
| CN | 111050187 A | 4/2020 |
| CN | 111586466 A | 8/2020 |
| CN | 111966804 A | 11/2020 |
| CN | 112131422 A | 12/2020 |
| CN | 112817670 A | 5/2021 |
| CN | 112907703 A | 6/2021 |
| CN | 113538628 A | 10/2021 |
| CN | 113568551 A | 10/2021 |
| CN | 113934349 A | 1/2022 |
| CN | 114693827 A | 7/2022 |
| CN | 114880062 A | 8/2022 |
| CN | 115269886 A | 11/2022 |
| WO | 2019047809 A1 | 3/2019 |
| WO | 2021/169134 A1 | 9/2021 |

OTHER PUBLICATIONS

Office Action for Chinese Patent Application No. 202210977422.9, mailed on Jan. 26, 2024, 21 pages.

"It Was Actually Easy! Introducing How to Make Animations", LINE Stamp Official Blog, [online], Oct. 13, 2021, 14 Pages, Retrieve from the Internet—https://linesticker-ja.blog.jp/archives/10982874.html.

"LINE Stamp Maker—Easy to Use with Your Smartphone! Make LINE Stamps!", [online], Jun. 18, 2022, 14 Pages, Retrieve from the Internet—https://web.archive.org/web/20220617011329/https://creator.line.me/ja/stickermaker/.

Notice of Refusal for Japanese Application No. 2024-568015, mailed May 27, 2025, 12 pages.

Extended European Search Report received for Application No. 23854392.0, mailed Jun. 30, 2025, 31 pages.

\* cited by examiner

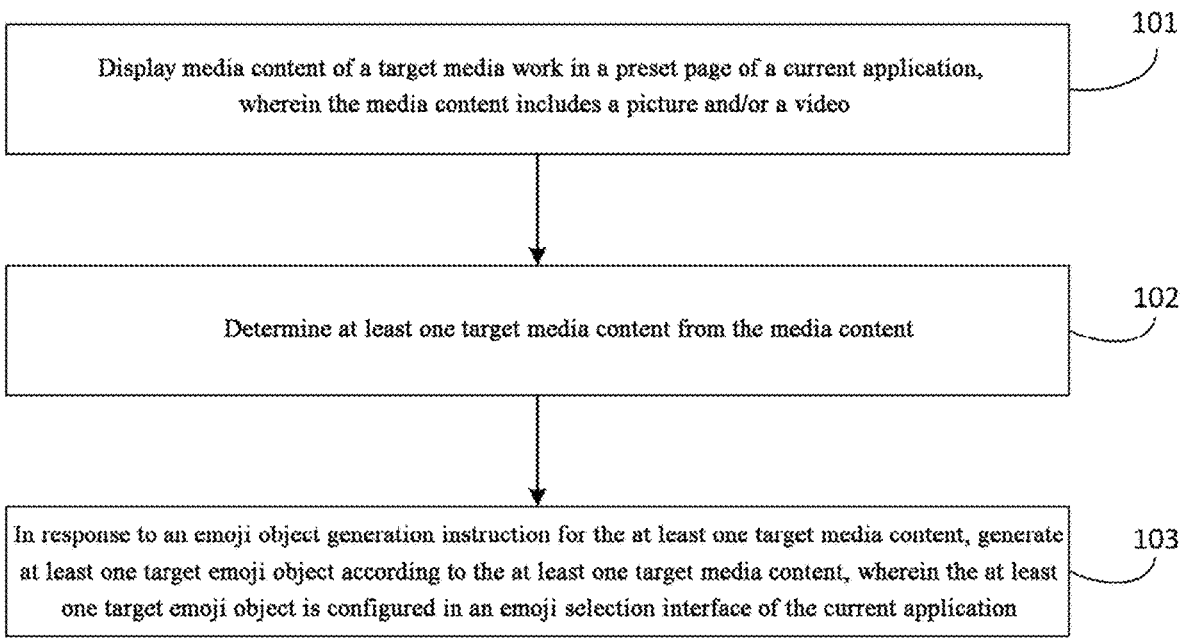

| | |
|---|---|
| Display media content of a target media work in a preset page of a current application, wherein the media content includes a picture and/or a video | 101 |
| Determine at least one target media content from the media content | 102 |
| In response to an emoji object generation instruction for the at least one target media content, generate at least one target emoji object according to the at least one target media content, wherein the at least one target emoji object is configured in an emoji selection interface of the current application | 103 |

FIG. 1

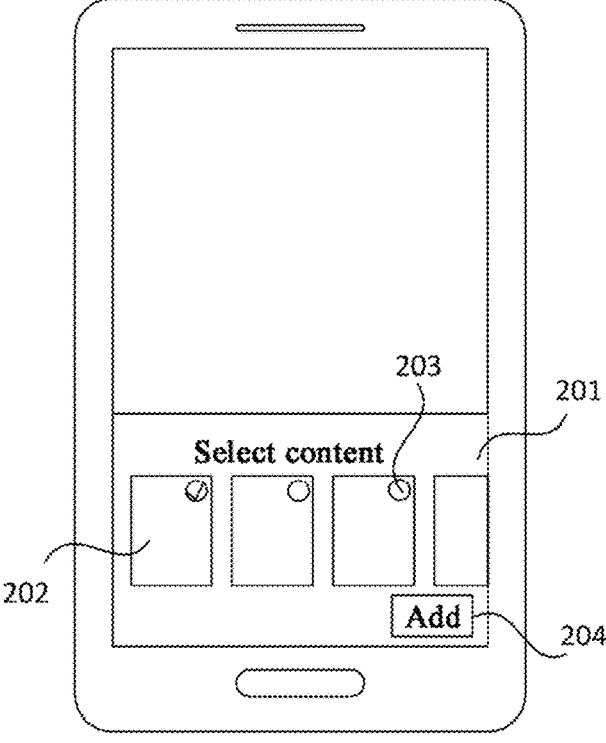

FIG. 2

MEDIA CONTENT PROCESSING METHOD AND APPARATUS, DEVICE, AND STORAGE MEDIUM

CROSS-REFERENCE TO RELATED APPLICATION(S)

This application is a Continuation Application of International Patent Application No. PCT/CN2023/112878, filed Aug. 14, 2023, which claims priority to Chinese Patent Application No. 202210977422.9, filed with the China National Intellectual Property Administration on Aug. 15, 2022, the disclosures of which are incorporated herein by reference in their entireties.

FIELD

Embodiments of the present disclosure relate to the technical field of computers, and for example, to a method and apparatus, a device, and a storage medium for media content processing.

BACKGROUND

With the rapid development of Internet technology, it is more and more convenient for users to communicate with each other. The users may conduct various information interactions through applications.

SUMMARY

The embodiments of the present disclosure provide a method and apparatus, a storage medium, and a device for media content processing.

In a first aspect, the embodiments of the present disclosure provide a method for media content processing, including:

displaying media content of a target media work on a preset page of a current application, wherein the media content includes a picture and/or a video;

determining at least one target media content from the media content; and in response to an emoji object generation instruction for the at least one target media content, generating at least one target emoji object according to the at least one target media content, wherein the at least one target emoji object is configured in an emoji selection interface of the current application.

In a second aspect, the embodiments of the present disclosure further provide a media content processing apparatus, including:

a media content display module, configured to display media content of a target media work on a preset page of a current application, wherein the media content includes a picture and/or a video;

a target content determining module, configured to determine at least one target media content from the media content; and an emoji object generation module, configured to: in response to an emoji object generation instruction for the at least one target media content, generate at least one target emoji object according to the at least one target media content, wherein the at least one target emoji object is configured in an emoji selection interface of the current application.

In a third aspect, the embodiments of the present disclosure provide an electronic device. The electronic device includes:

one or more processors; and a storage apparatus, configured to store one or more programs, wherein the one or more programs, when performed by the one or more processors, cause the one or more processors to implement the method for media content processing provided in the embodiments of the present disclosure.

In a fourth aspect, the embodiments of the present disclosure further provide a storage medium including computer-executable instructions. When executed by a computer processor, the computer-executable instructions are used for performing the media content processing method provided in the embodiments of the present disclosure.

BRIEF DESCRIPTION OF THE DRAWINGS

Throughout the accompanying drawings, identical or similar reference numerals represent identical or similar elements. It should be understood that the accompanying drawings are illustrative, and components and elements may not necessarily be drawn to scale.

FIG. 1 is a flowchart of a method for media content processing according to an embodiment of the present disclosure;

FIG. 2 is a schematic diagram of an interface according to an embodiment of the present disclosure;

DETAILED DESCRIPTION OF EMBODIMENTS

Figures 3, 4:
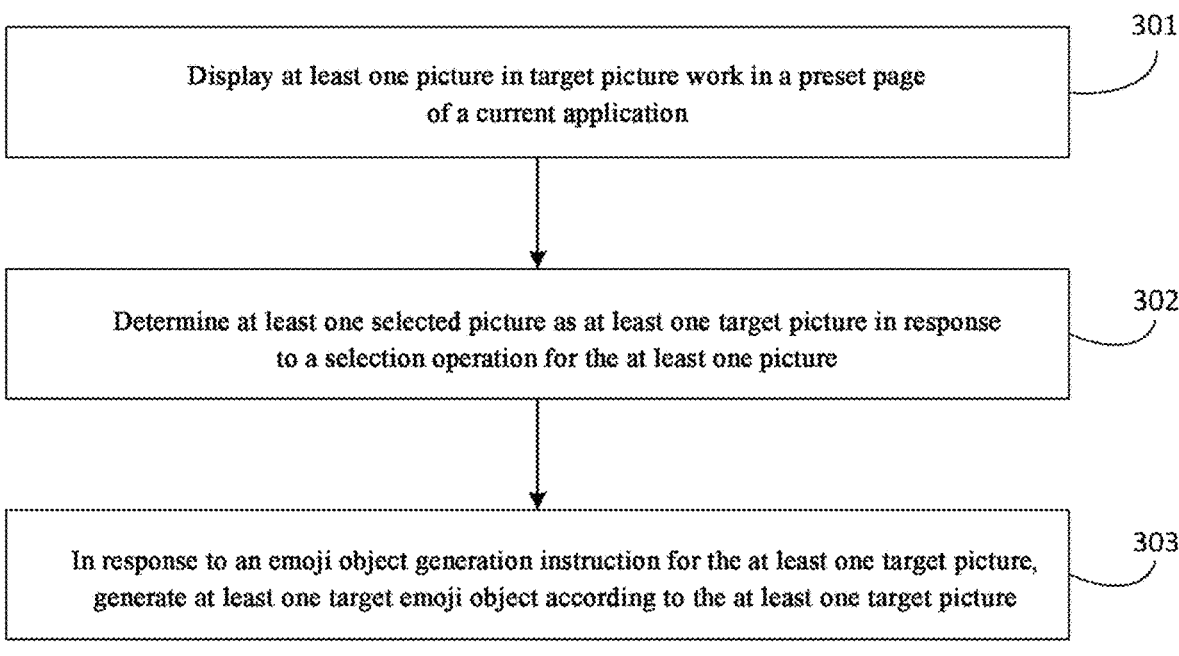
FIG. 3 is a flowchart of another method for media content processing according to an embodiment of the present disclosure.
FIG. 4 is a flowchart of still another method for media content processing according to an embodiment of the present disclosure.

The embodiments of the present disclosure will be described below with reference to the accompanying drawings. It should be understood that the accompanying drawings and embodiments of the present disclosure are only used for illustration, but are not intended to limit the protection scope of the present disclosure.

It should be understood that respective steps recorded in method implementations of the present disclosure can be executed in different orders and/or in parallel.

The term "include" and its variants as used herein mean widespread inclusion, namely, "including but not limited to". The term "based on" is "based at least in part on". The term "one embodiment" means "at least one embodiment". The term "another embodiment" means "at least another embodiment". The term "some embodiments" means "at least some embodiments". Relevant definitions of other terms will be given in the description below.

It should be noted that the concepts such as "first" and "second" mentioned in the present disclosure are only used to distinguish different apparatuses, modules, or units, and are not intended to limit the order or interdependence of the functions performed by these apparatuses, modules, or units.

It should be noted that the modifications of "one" and "plurality" mentioned in the present disclosure are indicative rather than restrictive, and those skilled in the art should understand that unless otherwise explicitly stated in the context, they should be understood as "one or more".

Messages or names of information interacted between a plurality of apparatuses in the implementations of the present disclosure are only for illustrative purposes and are not intended to limit the messages or the scope of the information.

It can be understood that before use of the technical solutions disclosed in various embodiments of the present disclosure, users should be informed of the type, scope of use, usage scenarios, and the like of personal information involved in the present disclosure in accordance with relevant laws and regulations in an appropriate manner, so as to obtain authorization from the users.

For example, in response to that an active request of a user has been received, prompt information is sent to the user to clearly remind the user that personal information of the user needs to be involved in an operation requested to be executed. Thus, the user can independently select whether to provide the personal information to software or hardware such as an electronic device, an application, a server, or a storage medium that performs the operation of the technical solutions of the present disclosure according to the prompt information.

As an alternative but non-restrictive implementation, in response to that an active request of a user has been received, prompt information is sent to the user through, for example, a pop-up window where the prompt information can be presented in text. In addition, the pop-up window can also carry a selection control for the user to select whether to "agree" or "refuse" to provide the personal information to the electronic device.

It can be understood that the above notification and above user authorization obtaining process are only illustrative and do not constitute a limitation on the implementations of the present disclosure. Other methods that meet the relevant laws and regulations can also be applied to the implementations of the present disclosure.

It can be understood that data involved in the technical solutions (including but not limited to the data itself, and obtaining or use of the data) should comply with the requirements of corresponding laws and regulations and relevant provisions.

Interaction based on emoji and the like is a way of expressing using pictures. Compared with text messages, emoji objects can more vividly and accurately expressing of the users and have been widely used. The emoji objects are often provided by applications, and the users can chat or make comments using the emoji objects in the applications.

FIG. 1 is a flowchart of a method for media content processing according to an embodiment of the present disclosure. This embodiment of the present disclosure is applicable to a situation for processing media content. The method may be performed by an apparatus for media content processing. The apparatus may be implemented in the form of software and/or hardware. Alternatively, the apparatus is implemented by an electronic device. The electronic device may be a mobile terminal, a smartwatch, a tablet, a personal digital assistant, and another mobile terminal, or may be a personal computer (PC) end, a server, or the like.

As shown in FIG. 1, the method includes:

Step 101. Displaying media content of a target media work on a preset page of a current application. The media content includes a picture and/or a video.

In this embodiment of the present disclosure, the current application may be a preset application. The preset page may be a page in the preset application. The preset application may provide a media work display function and an emoji object generation function. Exemplarily, when a user needs to use the emoji object generation function, the user can open the preset page in the preset application. The media work includes one or more media contents. The media content may include a picture and/or a video, and may further include an audio. This will not be specifically limited. The picture may include a static picture and a dynamic picture, such as a Graphics Interchange Format (GIF) dynamic picture. The picture or video frames of the video may include image content and/or text content.

In this embodiment of the present disclosure, the target media work may be understood as media work to which media content currently displayed on the preset page belongs. The media content currently displayed on the preset page may include the entirety or a part of media content in the target media work. The display mode may be the same as or different from that of the target media work. For example, compared with the display mode of the target media work, the media content may be displayed in a thumbnail manner, such as reducing the image size or scale.

A poster of a media work may set attribute information for each media content in the media work before posting the media work. The attribute information can be used for indicating whether the corresponding media content is allowed to be used by other users to generate emoji objects. The attribute information corresponding to the media content displayed on the preset page indicates that the media content is allowed to be used to generate an emoji object. Namely, the function of generating an emoji object according to the media content in the media work is fully authorized by the poster of the media work.

Exemplarily, FIG. 2 is a schematic diagram of an interface according to an embodiment of the present disclosure. As shown in FIG. 2, media content 202 is displayed on a preset page 201. The displayed media content is a part of media content in target media work. The fourth media content is not fully displayed. Displaying of different pieces of media content can be switched by inputting operations such as sliding to the left or sliding to the right. The target media work may only contain one media content. At this time, the entirety or a part of the media content may be displayed.

Step 102. Determining at least one target media content from the media content.

In this embodiment of the present disclosure, the target media content may be understood as a media material used for generating an emoji object. The determination of the target media content may be automatically determined by the current application or independently determined by a user.

Alternatively, at least one target media content is determined from the media content, which includes: At least one selected media content is determined as the at least one target media content in response to a selection operation for the media content. The advantage of this setting is that a user may be allowed to more freely select the target media content, to achieve personalized customization of an emoji object.

Exemplarily, when the media content is displayed on the preset page, a selection control corresponding to each media content can be displayed too, such as a check box or a positioning cursor. A user can input a selection operation through the selection control to select desired media content to generate an emoji object. After the selection operation performed by the user on the media content, in response to the selection operation of the user, the selected media content is determined as the target media content.

As shown in FIG. 2, a check box 203 can be displayed on the media content. A user can select, by checking the check box, media content to which the check box belongs. The first media content in FIG. 2 is selected.

Alternatively, in a case that the target media work only includes one media content, the media content can be automatically determined as the target media content.

Step 103. In response to an emoji object generation instruction for the at least one target media content, generating at least one target emoji object according to the at least one target media content. The at least one target emoji object is configured in an emoji selection interface of the current application.

Exemplarily, after the emoji object generation instruction for the target media content is received, a media resource corresponding to the target media content can be obtained, such as picture data or video frame data, and a relevant operation such as image processing, format conversion, or encoding is performed the obtained media resource, to generate the corresponding target emoji object. The emoji object can be an emoji, a sticker, or the like.

Alternatively, a preset generation control may be displayed on the preset page. A user can input the emoji object generation instruction by triggering the preset generation control. As shown in FIG. 2, an "add" button 204 is displayed as the preset generation control. After a user clicks the "add" button 204, the target emoji object can be generated.

In this embodiment of the present disclosure, the target emoji object is configured in an emoji selection interface of the current application. The user may select the target emoji object based on the emoji selection interface and apply the target emoji object. Alternatively, the generated target emoji object can be used for information interaction, such as sending an instant message containing the target emoji object, posting a comment message containing the target emoji object, and the like. The generated target emoji object can be added into an emoji library in a preset application, so that the target emoji object can be displayed in the emoji selection interface in the preset application for selection by the user. For example, the target emoji object can be added into a customized emoji set in the emoji library. Alternatively, the target emoji object may be used for information interaction between a current user (i.e. a user triggering the generation of the target emoji object) and the poster of the target media work, to enhance the interaction experience between them.

According to the method for media content processing provided in this embodiment of the present disclosure, media content of a target media work is displayed on a preset page of a current application, and the media content includes a picture and/or a video; at least one target media content is determined from the media content; and in response to an emoji object generation instruction for the target media content, a target emoji object is generated according to the target media content, and the target emoji object is configured in an emoji selection interface of the current application. By use of the above technical solution, in a process that a user viewing the media work, the emoji object may be generated according to the media content in the media work, and the generated emoji object is configured in the emoji selection interface of the current application, to meet a personalized emoji object generation need of the user and enrich emoji object styles, so that the user can have more personalized selections when selecting an emoji object for application from the emoji selection interface, thereby enhancing the user experience. Meanwhile, the use of the media content in the media work may be enriched, and the utilization rate of media content resources can be increased.

In some embodiments, the target media work includes target picture work. The target picture work includes at least one picture, namely, a single picture or a plurality of pictures. Exemplarily, the target picture work further includes an audio. When the target picture work is displayed, the audio can be used as background music, and the plurality of pictures are played in turn according to a preset sequence. The plurality of pictures can be cyclically played.

FIG. 3 is a flowchart of another method for media content processing according to an embodiment of the present disclosure. Target picture work used as target media work is taken as an example, which will be explained based on the above optical embodiments. The method may include:

Step 301. Displaying at least one picture in the target picture work on a preset page of a current application.

Exemplarily, in a case that the target picture work includes a plurality of pictures, when displayed, the pictures in the target picture work can be displayed one by one or in a batch. The number of pictures displayed in a batch displays is less than or equal to the total number of the pictures in the target picture work, and a display sequence of the pictures can be consistent with a sequence of the images during the displaying of the target picture work.

Exemplarily, as shown in FIG. 2, the media content 202 may be a picture in the target picture work.

Step 302. Determining at least one selected picture as at least one target picture in response to a selection operation for the at least one picture.

Exemplarily, as shown in FIG. 2, the target picture can be determined according to a selection operation performed by a user on the check box.

Step 303. In response to an emoji object generation instruction for the at least one target picture, generating at least one target emoji object according to the at least one target picture.

Alternatively, a single target emoji object contains one or more target pictures.

Exemplarily, each target picture may generate a target emoji object separately. Two or more target pictures may be merged to generate a target emoji object. For example, a target emoji object with a dynamic picture effect can be generated based on two or more target pictures.

Alternatively, the target emoji object includes a dynamic emoji object. The dynamic emoji object is generated by a dynamic picture among the at least one target picture and/or a plurality of static pictures among the at least one target picture.

Alternatively, preset generation controls respectively corresponding to two generation modes can be displayed on the preset page, i.e. a first preset generation control: an "add separately" button, and a second preset generation control: a "merge and add" button, to meet different emoji object generation needs of users.

According to the method for media content processing provided in this embodiment of the present disclosure, a user can select pictures in picture work when viewing the picture work, and one or more emoji objects are generated according to one or more pictures selected by the user, to meet a personalized emoji object generation need of the user and enrich emoji object styles, thereby enhancing the user experience. Meanwhile, the use of pictures in the picture work can be enriched too, and the utilization rate of picture resources can be increased.

In some embodiments, the target media work includes a target video work. The target video work includes a plurality of video frames.

FIG. 4 is a flowchart of still another method for media content processing according to an embodiment of the present disclosure. Target video work used as target media work is taken as an example, which will be explained based on the above optical embodiments. The method may include:

Step 401. Displaying video progress information corresponding to the target video work on a preset page of a current application.

Exemplarily, the video progress information may be a progress bar, a video frame sequence, video chapter information, or the like. If the video progress information is the video frame sequence, the displayed video frame sequence may include all or part of video frames (which may be thumbnails) in the target video work, and the sequence of the video frames in the video frame sequence may be consistent with a playing sequence of the video frames in the target video work.

Figure 5:
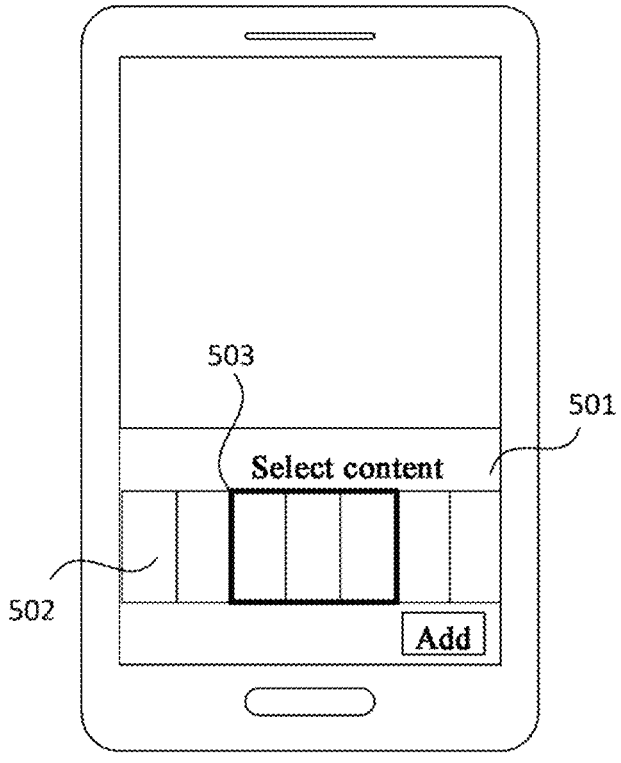
FIG. 5 is a schematic diagram of another interface according to an embodiment of the present disclosure.

FIG. 5 is a schematic diagram of another interface according to an embodiment of the present disclosure. A video frame sequence 502 of the video work is displayed on a preset page 501.

Step 402. At least one target video frame set is determined in response to a video frame selection operation for the video progress information. Each target video frame set includes at least one video frame.

Exemplarily, a certain number of single video frames (which can be understood as one or more video screenshots) in the target video work may be selected to generate emoji objects, or one or more groups of consecutive video frames (which can be understood as one or more video clips) in the target video work may be selected to generate emoji objects. The video frame selection operation may be a selection operation for a single video frame or a batch selection operation for a plurality of video frames.

Exemplarily, for the selection of a video clip, this step may include: In response to a start frame selection operation and an end frame selection operation for the video progress information, a start video frame and an end video frame are determined; and the at least one target video frame set is determined according to the start video frame and the end video frame. Each target video frame set includes a start frame video, an end video frame, and zero or at least one intermediate video frame. The intermediate video frame is located between the corresponding start video frame and the corresponding end video frame in the video progress information. The advantage of this setting is that it may be convenient for selection of video clips, so that corresponding emoji objects can be quickly generated according to the video clips. Alternatively, the target video frame set may only include at least one intermediate video frame.

The start frame selection operation is used for selecting the start video frame, and the end frame selection operation is used for selecting the end video frame. A start frame selection identifier and an end frame selection identifier can be associated and displayed on the video progress information. A user may determine the start video frame by adjusting a position pointed by the start frame selection identifier and determine the end video frame by adjusting a position pointed by the end frame selection identifier.

Exemplarily, the start frame selection identifier and the end frame selection identifier can be displayed in pairs. A pair of identifiers corresponds to one target video frame set. For one target video frame set, when no intermediate video frame exists between the start video frame and the end video frame, the target video frame set contains two video frames, i.e., the start video frame and the end video frame.

Exemplarily, as shown in FIG. 5, a video frame selection box 503 is associated and displayed on the video frame sequence 502. A left boundary of the video frame selection box 503 can be understood as the starting frame selection identifier, and a right boundary can be understood as the ending frame selection identifier. A user may adjust a selected video frame range by dragging the left or right boundary of the video frame selection box 503.

Step 403. In response to an emoji object generation instruction for the at least one target video frame set, generating at least one target emoji object according to the at least one target video frame set.

Alternatively, a single target emoji object includes one or more target video frame sets.

Exemplarily, each target video frame set may separately generate a target emoji object. Two or more target video frame sets may be combined to generate one target emoji object.

Alternatively, the target emoji object includes a dynamic emoji object. The dynamic emoji object is generated by target video frame sets among the at least one target video frame set.

Alternatively, preset generation controls respectively corresponding to the two generation modes can be displayed on the preset page, i.e. a third preset generation control: a "generate separately" button, and a fourth preset generation control: a "merge and generate" button, to meet different emoji object generation needs of users.

According to the method for media content processing provided in this embodiment of the present disclosure, a user can select video frames in video work when viewing the video work, and one or more emoji objects are generated according to one or more video frame sets selected by the user, to meet a personalized emoji object generation need of the user and enrich emoji object styles, thereby enhancing the user experience. Meanwhile, the use of video content in the video work can be enriched too, and the utilization rate of video resources can be increased.

In some embodiments, before at least one target emoji object is generated according to the at least one target media content, the method further includes: at least one preview emoji object is generated according to the at least one target media content, and the at least one preview emoji object is displayed. The advantage of this setting is that a preview function can be provided before the emoji object is generated, so that a user may preview an effect of the emoji object in advance, so as to avoid repeated modification and improve the emoji object generation efficiency.

Alternatively, in a case that a plurality of preview emoji objects is generated, one or more preview emoji objects can be displayed.

Exemplarily, the preview emoji objects may be displayed on the preset page or in target display regions beyond the preset page. For example, as shown in FIG. 2 and FIG. 5, the target display region may be set above the preset page 201 and the preset page 501, and the preview emoji objects may be displayed in the target display regions.

In some embodiments, the method further includes: An editing operation for the at least one preview emoji object is received. At least one target emoji object is generated according to the at least one target media content, which includes: The at least one target emoji object is generated according to the at least one target media content and an editing result of the editing operation. The advantage of this setting is that a user may be allowed to perform edition operation based on the preview emoji objects, so that the generated target emoji object is more aligned with an own need of the user. The editing operation may include, for example, adding text, adding textures, adjusting dimensions, or the like.

In some embodiments, before media content of a target media work is displayed on a preset page of a current application, the method further includes: On a target display page for the target media work of the current application, in response to a first preset triggering operation for the preset page, the preset page is displayed. The advantage of this setting is that a user is allowed to conveniently input the preset page when viewing the target media work.

Alternatively, the first preset triggering operation may be a triggering operation for a preset entry of the preset page, or an operation for the preset page and triggered to input the preset page, such as a double-click operation.

Alternatively, the preset entry may be an entry control in the target display page, such as a "convert to emoji" button. When the preset entry is triggered, the preset page can be triggered to be displayed.

Alternatively, the size of the preset page may be the same as or different from the size of the target display page. When the size of the preset page is smaller than the size of the target display page, the preset page may be stacked on a top of the target display page. In this case, the target media work may continue to be displayed on the target display page. A user may continue to view the target media work when setting emojis.

In this embodiment of the present disclosure, the target media work may carry a work tag. The work tag can be, for example, used for indicating the type of the media work or a topic related to the media work. Exemplarily, the poster of the target media work can add the work tag to the target media work when posting the target media work. The preset identifier may include a work tag related to an emoji, or may be referred to as a preset emoji tag, such as #Emoji #, #DouTu #, #Emoticon #, or #New Emoji #.

In some embodiments, the method further includes: In the process of displaying the target media work on the target display page, a preset control display region is displayed on the target display page in response to a second preset triggering operation; whether the target media work carries a preset identifier is determined; and in response to a determination result indicating that the target media work carries the preset identifier, a preset entry of the preset page is displayed at a first preset display position in the preset control display region. The advantage of this setting is that a display position of the preset entry can be flexibly determined according to whether the target media work carries the preset identifier. If the target media work carries the preset identifier, the preset entry will be displayed at a preset display position.

Exemplarily, the preset control display region may further include a preset interaction control, such as a view together control, a like control, a share control, and a comment control, and may further include a preset function control, such as save control. The first preset display position may be a preset fixed position in the preset control display region, or a relative position determined according to a display position for a preset interaction control and/or a preset function control in the preset control display region. The relative position relationship between the first preset display position and the current display position can be preset.

In some embodiments, after whether the target media work carries a preset identifier is determined, the method further includes: If the target media work does not carry the preset identifier, a preset entry of the preset page is displayed at a second preset display position in the preset control display region. A display priority of the first preset display position is higher than a display priority of the second preset display position. The advantage of this setting is that in a case of carrying the preset identifier, it indicates that the target media work is more likely to be used for generating emojis. Displaying the preset entry at a position with a higher display priority can make it more convenient for a user to trigger the preset entry: If the target media work does not carry the preset identifier, the display priority can be lower to properly use the preset control display region to display the control.

Figure 6:
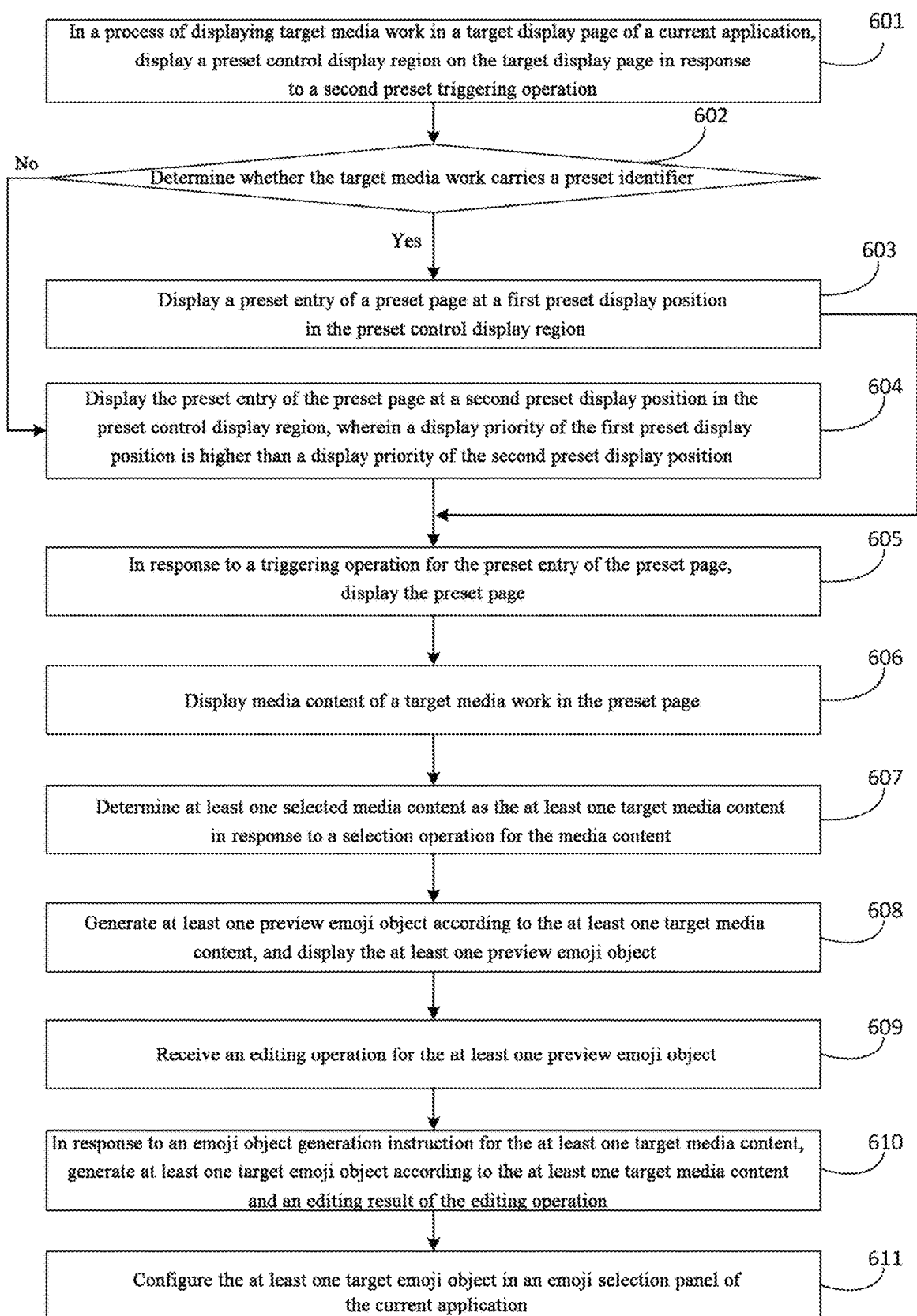
FIG. 6 is a flowchart of still another method for media content processing according to an embodiment of the present disclosure.

FIG. 6 is a flowchart of yet another method for media content processing according to an embodiment of the present disclosure. This embodiment of the present disclosure will be explained based on the alternative solutions in the above embodiments. The method includes the following steps:

Step 601. In a process of displaying target media work on a target display page of a current application, a preset control display region is displayed on the target display page in response to a second preset triggering operation.

Figure 7:
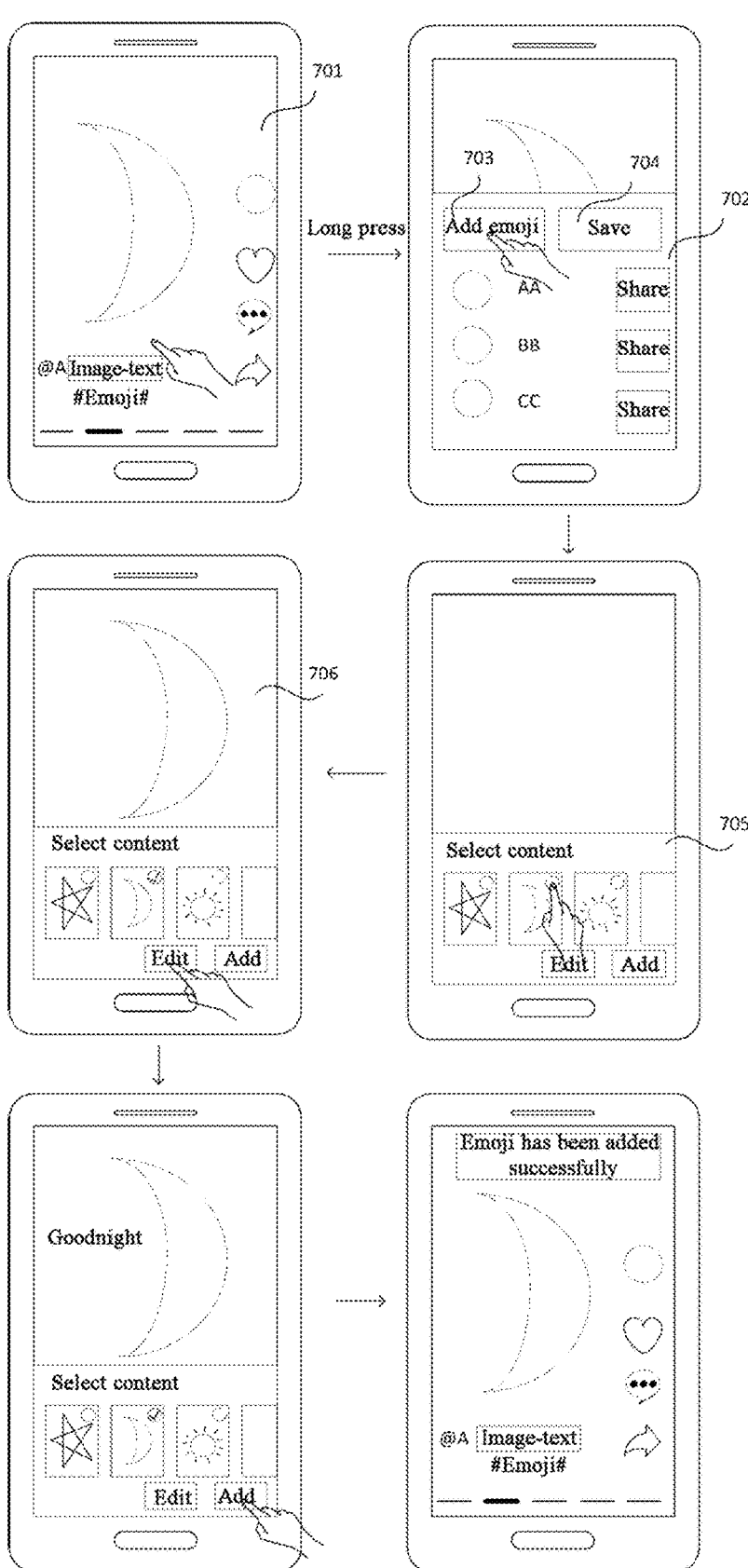
FIG. 7 is a schematic diagram of interface interaction according to an embodiment of the present disclosure.

FIG. 7 is a schematic diagram of interface interaction according to an embodiment of the present disclosure. Target picture work used as target media work is taken as an example. The target picture work is displayed on a target display page 701. When a second picture in the target picture work is displayed, a user enters a long-press operation (a preset triggering operation) into the target display page 701, and a preset control display region 702 is displayed on the target display page 701.

Step 602. Whether the target media work carries a preset identifier is determined. If yes, step 603 is executed. If the target media work does not carry the preset identifier, step 604 is executed.

Alternatively, step 602 may also be executed before the preset control display region is displayed on the target display page. After the preset control display region is displayed, a display position of a preset entry is directly decided according to a determination result of step 602, which can increase the display speed of the preset entry.

As shown in FIG. 7, if the target picture work carries a tag #Emoji # (preset identifier), step 603 will be executed.

Step 603. A preset entry of a preset page is displayed at a first preset display position in the preset control display region, and step 605 is executed.

Exemplarily, a display priority of a preset display position may be determined according to a relative position relationship between the preset display position and a display position of a preset interaction control and/or a preset function control in the preset control display region.

For example, as shown in FIG. 7, the preset entry is an emoji add button 703, and the preset function control is a save button 704. If the target image work carries the preset identifier, the emoji add button 703 will be displayed in front of the save button 704. If the target picture work does not carry the identifier, the emoji add button 703 will be displayed behind the save button 704. For example, the emoji add button 703 and the save button 704 can be swapped, or the emoji add button 703 in the picture may be replaced with another control, such as a view together control. The emoji add button 703 will be set behind the save button 704. After a user enters a left sliding operation, the emoji add button 703 will be displayed.

Step 604. The preset entry of the preset page is displayed at a second preset display position in the preset control display region. A display priority of the first preset display position is higher than a display priority of the second preset display position.

Step 605: In response to a triggering operation for the preset entry of the preset page, the preset page is displayed.

As shown in FIG. 7, after a user clicks the emoji add button 703, a preset page 705 is displayed.

Step 606. Media content of a target media work is displayed on the preset page.

As shown in FIG. 7, a plurality of pictures in the target picture work are displayed on the preset page 705. A check box is displayed on each picture.

Step 607. At least one selected media content is determined as the at least one target media content in response to a selection operation for the media content.

As shown in FIG. 7, a user clicks on the checkbox of the second image including a moon pattern to determine the second picture as the target media content.

Step 608. At least one preview emoji object is generated according to the at least one target media content, and the at least one preview emoji object is displayed.

As shown in FIG. 7, a preview emoji object is generated according to the second picture and is displayed on a target display region 706. Alternatively, if the user continues to select another picture, a preview emoji object may be generated according to the newly selected picture and is then displayed. Alternatively, the user may switch the displaying of different preview emoji objects by triggering the media content in the preset page.

Step 609. An editing operation for the at least one preview emoji object is received.

As shown in FIG. 7, if the user intends to further edit the emoji object, the user may click on an edit button for edition, such as adding text "Goodnight". An editing result can be displayed in real time on the target display region.

Step 610. In response to an emoji object generation instruction for the at least one target media content, at least one target emoji object is generated according to the at least one target media content and an editing result of the editing operation.

As shown in FIG. 7, if the user is satisfied with a current preview effect, the user may input an emoji object generation instruction by clicking on an add button, to indicate generation of an emoji object.

Exemplarily, if the user is satisfied with an initial preview emoji object, the user does not need to edit the initial preview emoji object and may directly input san emoji object generation instruction by clicking on an add button.

In other embodiments, in a case of supporting a user to select a plurality of pictures or video frames, the preset control display region 702 may include a "merge and generate" button for merging the plurality of pictures or video frames into one emoji object, and a "generate separately" button for separately synthesizing emoji objects, so that the user may select different emoji object synthesis results according to needs.

Step 611. The at least one target emoji object is configured in an emoji selection interface of the current application.

Exemplarily, after the target emoji object is successfully generated, the target emoji object can be added into an emoji library of the current application, to configure the target emoji object in the emoji selection interface of the current application, and the target media work is then continued to be displayed on the target display page. In addition, an add success notification may be further displayed on the target display page, such as "Emoji has been added successfully" shown in FIG. 7.

According to the method for media content processing provided in this embodiment of the present disclosure, a user can conveniently trigger the displaying of a control display region when browsing media work, and determine, according to whether the media work carries a preset emoji tag, a display position of a preset entry of a preset page used for generating an emoji object. When the user intends to generate an emoji object according to media content in the media work, the user can trigger the preset entry and enter the preset page, select media content on the preset page, and view preview emoji objects. The user can also edit the preview emoji objects to generate a personalized emoji object that better meets an own need, and add the personalized emoji object to an emoji library. This facilitates subsequently searching the emoji library for the emoji object and using the emoji object and is conductive to enhancing the interaction experience with an interaction object.

Figure 8:
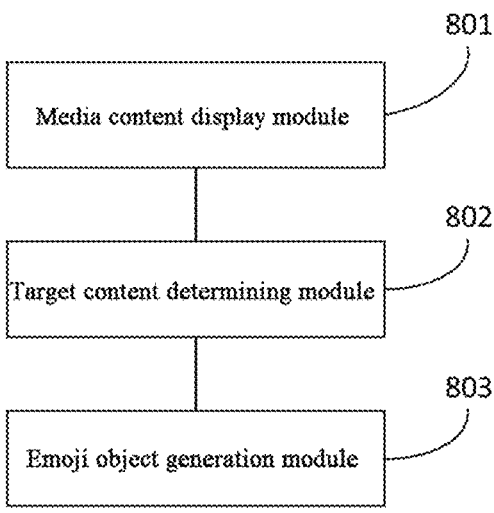
FIG. 8 is a schematic structural diagram of an apparatus for media content processing according to an embodiment of the present disclosure.

FIG. 8 is a schematic structural diagram of an apparatus for media content processing according to an embodiment of the present disclosure. As shown in FIG. 8, the apparatus includes: a media content display module 801, a target content determining module 802, and an emoji object generation module 803.

The media content display module 801 is configured to display media content of a target media work on a preset page, and the media content includes a picture and/or a video; the target content determining module 802 is configured to determine at least one target media content from the media content; and the emoji object generation module 803 is configured to: in response to an emoji object generation instruction, generate a target emoji object according to the at least one target media content.

According to the apparatus for media content processing provided in this embodiment of the present disclosure, media content of a target media work is displayed on a preset page of a current application, wherein the media content includes a picture and/or a video; at least one target media content is determined from the media content: and in response to an emoji object generation instruction for the target media content, a target emoji object is generated according to the target media content, wherein the target emoji object is configured in an emoji selection interface of the current application. By use of the above technical solution, in a process that a user viewing the media work, the emoji object can be generated according to the media content in the media work, and the generated emoji object is configured in the emoji selection interface of the current application, to meet a personalized emoji object generation need of the user and enrich emoji object styles, so that the user can have more personalized selections when selecting an emoji object for application from the emoji selection interface, thereby enhancing the user experience. Meanwhile, the use of the media content in the media work can be enriched, and the utilization rate of media content resources can be increased.

Alternatively, the target content determining module is configured to determine at least one selected media content as the at least one target media content in response to a selection operation for the media content.

Alternatively, the target media work includes a target picture work: the target picture work includes at least one picture; and the media content display module is configured to: display the at least one picture in the target picture work on the preset page of the current application; and the target content determining module is configured to: determine at least one selected picture as at least one target picture in response to a selection operation for the at least one picture.

Alternatively, the target picture work includes a dynamic picture and/or a static picture.

Alternatively, the emoji object generation module 803 is configured to generate the at least one target emoji object according to the target media content in the following way: generating the at least one target emoji object according to the at least one target picture. A single target emoji object includes one or more target pictures among the at least one target picture.

Alternatively, the target media work includes a target video work; and the target video work includes a plurality of video frames. The media content display module is configured to display video progress information corresponding to the target video work on the preset page of the current application. The target content determining module is configured to determine at least one target video frame set in response to a video frame selection operation for the video progress information. Each target video frame set includes at least one video frame.

Alternatively, the emoji object generation module 803 is configured to generate the at least one target emoji object according to the at least one target media content in the following way: generating the at least one target emoji object according to the at least one target video frame set. A single target emoji object includes one or more target video frame sets among the at least one target video frame set.

Alternatively, the at least one target emoji object includes a dynamic emoji object. The dynamic emoji object is generated by at least one of the following: a dynamic picture among the at least one target picture, a plurality of static pictures among the at least one target picture, and a target video frame set among the at least one target video frame set.

Alternatively, the target content determining module includes: a video frame determining unit, configured to: in response to a start frame selection operation and an end frame selection operation for the video progress information, determine a start video frame and an end video frame; and a video frame set determining unit, configured to determine the at least one target video frame set according to the start video frame and the end video frame.

Alternatively, the apparatus further includes: a preview emoji object generation module, configured to: before generating at least one target emoji object according to the at least one target media content, generate at least one preview emoji object according to the at least one target media content, and display the at least one preview emoji object.

Alternatively, the apparatus further includes: an editing operation receiving module, configured to receive an editing operation for the at least one preview emoji object. The emoji object generation module 803 is configured to generate the at least one target emoji object according to the at least one target media content in the following way: generating the at least one target emoji object according to the at least one target media content and an editing result of the editing operation.

Alternatively, the apparatus further includes: a preset page display module, configured to: before the displaying media content of a target media work on a preset page of a current application, on a target display page for the target media work of the current application, in response to a first preset triggering operation for the preset page, display the preset page.

Alternatively, the apparatus further includes: a display region display module, configured to: in the process of displaying the target media work on the target display page, display a preset control display region on the target display page in response to a second preset triggering operation; a preset identifier determining module, configured to determine whether the target media work carries a preset identifier; and a first preset entry display module, configured to: in response to a determination result indicating that the target media work carries the preset identifier, display a preset entry of the preset page at a first preset display position in the preset control display region.

Alternatively, the apparatus further includes: a second preset entry display module, configured to: after determining whether the target media work carries a preset identifier, if the target media work does not carry the preset identifier, display a preset entry of the preset page at a second preset display position in the preset control display region. A display priority of the first preset display position is higher than a display priority of the second preset display position.

The apparatus for media content processing provided in this embodiment of the present disclosure can implement the media content processing method provided in any embodiment of the present disclosure, and includes corresponding functional modules for implementing the method and corresponding effects.

The various units and modules included in the above apparatus are only divided according to a functional logic, but are not limited to the above division, as long as the corresponding functions can be achieved. In addition, the names of the various functional units are only for the purpose of distinguishing and are not used to limit the protection scope of the embodiments of the present disclosure.

Figure 9:
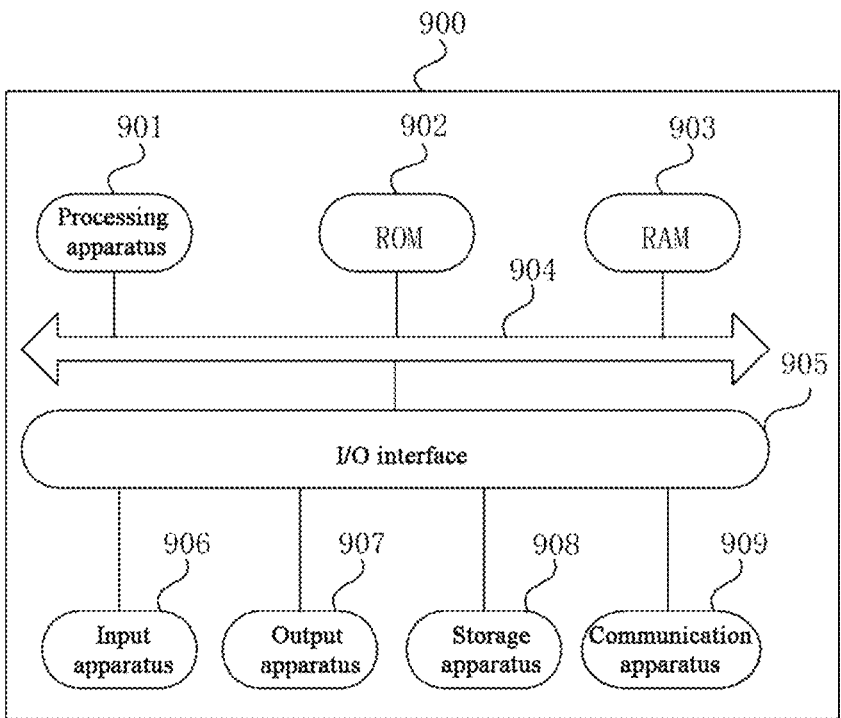
FIG. 9 is a schematic structural diagram of an electronic device according to the embodiments of the present disclosure.

FIG. 9 is a schematic structural diagram of an electronic device according to the embodiments of the present disclosure. Reference is now made to FIG. 9 below, which illustrates a schematic structural diagram of an electronic device (namely, a terminal device or a server in FIG. 9) 900 suitable for implementing an embodiment of the present disclosure. The terminal device in the embodiments of the present disclosure may include, but are not limited to, a mobile phone, a laptop, a digital broadcast receiver, a Personal Digital Assistant (PDA), a Portable Android Device (PAD), a Portable Media Player (PMP), a mobile terminal such as a vehicle-mounted terminal (for example, a vehicle-mounted navigation terminal), and a fixed terminal such as digital television (TV) and a desktop computer. The electronic device shown in FIG. 9 is only an example and should not impose any limitations on the functionality and scope of use of the embodiments of the present disclosure.

As shown in FIG. 9, the electronic device 900 may include a processing apparatus (such as a central processing unit and graphics processor) 901 that may perform various appropriate actions and processing according to programs stored in a Read-Only Memory (ROM) 902 or loaded from a storage apparatus 908 to a Random Access Memory (RAM) 903. Various programs and data required for operations of the electronic device 900 may also be stored in the RAM 903. The processing apparatus 901, the ROM 902, and the RAM 903 are connected to each other through a bus 904. An Input/Output (I/O) interface 905 is connected to the bus 904 too.

Usually, following apparatuses can be connected to the I/O interface 905: an input apparatus 906 including a touch screen, a touchpad, a keyboard, a mouse, a camera, a microphone, an accelerometer, a gyroscope, and the like; an output apparatus 907 including a Liquid Crystal Display (LCD), a speaker, a vibrator, and the like; a storage apparatus 908 including a magnetic tape, a hard disk drive, and the like and a communication apparatus 909. The communication apparatus 909 can allow the electronic device 900 to wirelessly or wiredly communicate with other devices to exchange data. Although FIG. 9 shows the electronic device 900 with multiple apparatuses, it should be understood that the electronic device 900 is not required to implement or have all the apparatuses shown, and can alternatively implement or have more or fewer apparatuses.

According to the embodiments of the present disclosure, the process described in the reference flowchart above can be implemented as a computer software program. For example, the embodiments of the present disclosure include a computer program product, including a computer program carried on a non-transitory computer-readable medium, and the computer program includes program codes used for performing the methods shown in the flowcharts. In such an embodiment, the computer program may be downloaded and installed from a network through the communication apparatus 909, or installed from the memory 908, or installed from the ROM 902. When the computer program is executed by the processing apparatus 901, the above-mentioned functions defined in the methods of the embodiments of the present disclosure are executed.

Messages or names of information interacted between a plurality of apparatuses in the implementations of the present disclosure are only for illustrative purposes and are not intended to limit the messages or the scope of the information.

The electronic device provided according to the embodiments of the present disclosure and the method for media content processing provided in the above embodiments belong to the same inventive concept. Technical details not fully described in this embodiment can be found in the above embodiments, and this embodiment has the same effects as the above embodiments.

The embodiments of the present disclosure provide a computer storage medium having a computer program stored thereon. Running of the program by a processor implements the media content processing method provided in the above embodiment.

The computer-readable medium mentioned in the present disclosure can be a computer-readable signal medium, a computer-readable storage medium, or any combination of the computer-readable signal medium and the computer-readable storage medium. The computer-readable storage medium can be, for example, but not limited to, electric, magnetic, optical, electromagnetic, infrared, or semiconductor systems, apparatuses, or devices, or any combination of the above. More specific examples of the computer-readable storage medium may include but are not limited to: an electrical connection with one or more wires, a portable computer disk, a hard disk drive, a RAM, a ROM, an Erasable Programmable Read Only Memory (EPROM) or flash memory, an optical fiber, a Compact Disc Read-Only Memory (CD-ROM), an optical storage device, a magnetic storage device, or any suitable combination of the above. In the present disclosure, the computer-readable storage medium may be any tangible medium that contains or stores a program, and the program can be used by or in combination with an instruction execution system, apparatus, or device. In the present disclosure, the computer-readable signal media may include data signals propagated in a baseband or as part of a carrier wave, which carries computer-readable program codes. The propagated data signals can be in various forms, including but not limited to: electromagnetic signals, optical signals, or any suitable combination of the above. The computer-readable signal medium may also be any computer-readable medium other than a computer-readable storage medium. The computer-readable signal medium can send, propagate, or transmit programs for use by or in combination with an instruction execution system, apparatus, or device. The program codes contained in the computer-readable medium can be transmitted using any suitable medium, including but not limited to: a wire, an optical cable, a Radio Frequency (RF), and the like, or any suitable combination of the above.

In some implementations, clients and servers can communicate using any currently known or future developed network protocol such as a HyperText Transfer Protocol (HTTP), and can intercommunicate and be interconnected with digital data in any form or medium (for example, a communication network). Examples of the communication network include a Local Area Network (LAN), a Wide Area Network (WAN), an internet (such as an Internet), a point-to-point network (such as an ad hoc point-to-point network, and any currently known or future developed network.

The computer-readable medium may be included in the electronic device or exist alone and is not assembled into the electronic device.

The computer-readable medium carries one or more programs. When the one or more programs is run by the electronic device, the electronic device is caused to: display media content of a target media work on a preset page of a current application, wherein the media content includes a picture and/or a video; determine at least one target media content from the media content; and in response to an emoji object generation instruction for the at least one target media content, generate at least one target emoji object according to the at least one target media content, wherein the at least one target emoji object is configured in an emoji selection interface of the current application.

Computer program codes for performing the operations of the present disclosure may be written in one or more programming languages or a combination thereof. The above programming languages include but are not limited to an object-oriented programming language such as Java, Smalltalk, and C++, and conventional procedural programming languages such as "C" language or similar programming languages. The program codes may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including (a LAN or a WAN, or can be connected to an external computer (for example, through an Internet using an Internet service provider).

The flowcharts and block diagrams in the accompanying drawings illustrate possible system architectures, functions, and operations that may be implemented by a system, a method, and a computer program product according to various embodiments of the present disclosure. In this regard, each block in a flowchart or a block diagram may represent a module, a program, or a part of a code. The module, the program, or the part of the code includes one or more executable instructions used for implementing specified logic functions. In some implementations used as substitutes, functions annotated in blocks may alternatively occur in a sequence different from that annotated in an accompanying drawing. For example, actually two blocks shown in succession may be performed basically in parallel, and sometimes the two blocks may be performed in a reverse sequence. This is determined by a related function. It is also noted that each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The units described in the embodiments of the present disclosure can be implemented through software or hardware. The names of the modules do not constitute a limitation on the modules. For example, the target content determination module can be also described as "module for determining at least one target media content from the media content".

The functions described herein above may be performed, at least in part, by one or a plurality of hardware logic components. For example, non-restrictively, example hardware logic components that can be used include: a Field Programmable Gate Array (FPGA), an Application Specific Integrated Circuit (ASIC), Application Specific Standard Parts (ASSP), a System on Chip (SOC), a Complex Programmable Logic Device (CPLD), and the like.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include an electrical connection based on one or more wires, a portable computer disk, a hard disk drive, a RAM, a ROM, an EPROM or flash memory, an optical fiber, a portable CD-ROM, an optical storage device, a magnetic storage device, or any suitable combinations of the above content.

According to one or more embodiments of the present disclosure, a method for media content processing is provided, including: displaying media content of a target media work on a preset page of a current application, wherein the media content includes a picture and/or a video; determining at least one target media content from the media content; and in response to an emoji object generation instruction for the at least one target media content, generating at least one target emoji object according to the at least one target media content, wherein the at least one target emoji object is configured in an emoji selection interface of the current application.

According to one or more embodiments of the present disclosure, determining at least one target media content from the media content includes: determining at least one selected media content as the at least one target media content in response to a selection operation for the media content.

According to one or more embodiments of the present disclosure, the target media work includes a target picture work; the target picture work includes at least one picture; the displaying media content of a target media work on a preset page of a current application includes: displaying the at least one picture in the target picture work on the preset page of the current application: and determining at least one selected media content as the at least one target media content in response to a selection operation for the media content includes: determining at least one selected picture as at least one target picture in response to a selection operation for the at least one picture.

According to one or more embodiments of the present disclosure, the at least one target picture work includes a dynamic picture and/or a static picture.

According to one or more embodiments of the present disclosure, generating at least one target emoji object according to the target media content includes: generating the at least one target emoji object according to the at least one target picture. A single target emoji object includes one or more target pictures among the at least one target picture.

According to one or more embodiments of the present disclosure, the target media work includes a target video work; the target video work includes a plurality of video frames; the displaying media content of a target media work on a preset page of a current application includes: displaying video progress information corresponding to the target video work on the preset page of the current application: and the determining at least one selected media content as the at least one target media content in response to a selection operation for the media content includes: determining at least one target video frame set in response to a video frame selection operation for the video progress information, wherein each target video frame set includes at least one video frame.

According to one or more embodiments of the present disclosure, generating at least one target emoji object according to the at least one target media content includes: generating the at least one target emoji object according to the at least one target video frame set. A single target emoji object includes one or more target video frame sets among the at least one target video frame set.

According to one or more embodiments of the present disclosure, the at least one target emoji object includes a dynamic emoji object. The dynamic emoji object is generated by at least one of the following: a dynamic picture among the at least one target picture, a plurality of static pictures among the at least one target picture, and a target video frame set among the at least one target video frame set.

According to one or more embodiments of the present disclosure, determining at least one target video frame set in response to a video frame selection operation for the video progress information includes: in response to a start frame selection operation and an end frame selection operation for the video progress information, determining a start video frame and an end video frame; and determining the at least one target video frame set according to the start video frame and the end video frame.

According to one or more embodiments of the present disclosure, before generating at least one target emoji object according to the at least one target media content, the method further includes: generating at least one preview emoji object according to the at least one target media content, and displaying the at least one preview emoji object.

According to one or more embodiments of the present disclosure, the method further includes: receiving an editing operation for the at least one preview emoji object. Generating at least one target emoji object according to the at least one target media content includes: generating the at least one target emoji object according to the at least one target media content and an editing result of the editing operation.

According to one or more embodiments of the present disclosure, before displaying media content of a target media work on a preset page of a current application, the method further includes: in a target display page for the target media work of the current application, in response to a first preset triggering operation for the preset page, displaying the preset page.

According to one or more embodiments of the present disclosure, the method further includes: in the process of displaying the target media work in the target display page, displaying a preset control display region in the target display page in response to a second preset triggering operation; determining whether the target media work carries a preset identifier; and in response to a determination result indicating that the target media work carries the preset identifier, displaying a preset entry of the preset page at a first preset display position in the preset control display region.

According to one or more embodiments of the present disclosure, after determining whether the target media work carries a preset identifier, the method further includes: if the target media work does not carry the preset identifier, displaying a preset entry of the preset page at a second preset display position in the preset control display region. A display priority of the first preset display position is higher than a display priority of the second preset display position.

According to one or more embodiments of the present disclosure, an apparatus for media content processing is provided, including: a media content display module, configured to display media content of a target media work on a preset page of a current application, wherein the media content includes a picture and/or a video; a target content determining module, configured to determine at least one target media content from the media content; and an emoji object generation module, configured to: in response to an emoji object generation instruction for the at least one target media content, generate at least one target emoji object according to the at least one target media content, wherein the at least one target emoji object is configured in an emoji selection interface of the current application.

According to one or more embodiments of the present disclosure, an electronic device is further provided. The electronic device includes: one or more processors; and a storage apparatus, configured to storage one or more programs. The one or more programs, when performed by the one or more processors, cause the one or more processors to implement the media content processing method provided in the embodiments of the present disclosure.

According to one or more embodiments of the present disclosure, a storage medium including computer-executable instructions is further provided. When executed by a computer processor, the computer-executable instructions are used for performing the media content processing method provided in the embodiments of the present disclosure.

Although various operations are depicted in a specific order, this should not be understood as requiring these operations to be executed in the specific order shown or in a sequential order. In certain environments, multitasking and parallel processing may be advantageous. Similarly, although specific implementation details are included in the above discussion, these should not be interpreted as limiting the scope of the present disclosure. Some features described in the context of individual embodiments can also be combined and implemented in a single embodiment. On the contrary, various features that are described in the context of the single embodiment may also be implemented in a plurality of embodiments separately or in any suitable sub-combinations.

Although the subject matter has been described in a language specific to structural features and/or method logical actions, it should be understood that the subject matter limited in the attached claims may not necessarily be limited to the specific features or actions described above. The specific features and actions described above are only exemplary forms for implementing the claims.

We claim:

1. A method for media content processing, comprising:
   displaying a target media work on a preset page of a current application, and the target media work is a work posted by a poster in the current application;
   displaying a media content of the target media work, wherein the media content comprises a picture or a video;
   in response to a trigger operation on the preset page displaying the target media work, determining at least one target media content from the media work;
   in response to an emoji object generation instruction for the at least one target media content, generating at least one target emoji object according to the at least one target media content, wherein the at least one target emoji object is configured in an emoji selection interface of the current application;
   wherein generating the at least one target emoji object comprises:
      converting the at least one target media content to generate at least one target emoji object; and
   attribute information of the target media work is configured by the poster, and the attribute information is configured to indicate whether the media content of the target media work is allowed to be used to generate the target emoji object.

2. The method of claim 1, wherein determining at least one target media content from the media content comprises:
   determining at least one selected media content as the at least one target media content in response to the selection operation for the media content.

3. The method according to claim 2, wherein the target media work comprises a target picture work; and the target picture work comprises at least one picture;
   wherein displaying the media content of a target media work on a preset page of the current application comprises:
      displaying the at least one picture in the target picture work on the preset page of the current application; and
   wherein determining the at least one selected media content as the at least one target media content in response to the selection operation for the media content comprises:
      determining the at least one selected picture as at least one target picture in response to a selection operation for the at least one picture.

4. The method according to claim 1, wherein the at least one target picture work comprises a dynamic picture and/or a static picture.

5. The method according to claim 3, wherein generating the at least one target emoji object according to the at least one target media content comprises:

generating the at least one target emoji object according to the at least one target picture, wherein a single target emoji object comprises one or more target pictures among the at least one target picture.

6. The method according to claim 2, wherein the target media work comprises a target video work, and the target video work comprises a plurality of video frames;

wherein displaying the media content of a target media work in a preset page of a current application comprises:

displaying video progress information corresponding to the target video work in the preset page of the current application; and wherein determining the at least one selected media content as the at least one target media content in response to the selection operation for the media content comprises:

determining at least one target video frame set in response to a video frame selection operation for the video progress information, wherein each target video frame set comprises at least one video frame.

7. The method according to claim 6, wherein generating the at least one target emoji object according to the at least one target media content comprises:

generating the at least one target emoji object according to the at least one target video frame set, wherein a single target emoji object comprises one or more target video frame sets among the at least one target video frame set.

8. The method according to claim 4, wherein the at least one target emoji object comprises a dynamic emoji object, and the dynamic emoji object is generated by at least one of the following: a dynamic picture among the at least one target picture, a plurality of static pictures among the at least one target picture, and a target video frame set among the at least one target video frame set.

9. The method according to claim 6, wherein determining the at least one target video frame set in response to the video frame selection operation for the video progress information comprises:

in response to a start frame selection operation and an end frame selection operation for the video progress information, determining a start video frame and an end video frame; and determining the at least one target video frame set according to the start video frame and the end video frame.

10. The method according to claim 1, wherein before generating the at least one target emoji object according to the at least one target media content, the method further comprises:

generating at least one preview emoji object according to the at least one target media content, and displaying the at least one preview emoji object.

11. The method according to claim 10, further comprising:

receiving an editing operation for the at least one preview emoji object, wherein generating at least one target emoji object according to the at least one target media content comprises:

generating the at least one target emoji object according to the at least one target media content and an editing result of the editing operation.

12. The method according to claim 1, wherein before displaying the media content of a target media work on the preset page of the current application, the method further comprises:

displaying the preset page in a target display page for the target media work of the current application in response to a first preset triggering operation for the preset page.

13. The method according to claim 12, further comprising:

in the process of displaying the target media work on the target display page, displaying a preset control display region in the target display page in response to a second preset triggering operation;

determining whether the target media work carries a preset identifier; and in response to a determination result indicating that the target media work carries the preset identifier, displaying a preset entry of the preset page at a first preset display position in the preset control display region.

14. The method according to claim 13, wherein after determining whether the target media work carries a preset identifier, the method further comprises:

in response to a determination result indicating that the target media work does not carry the preset identifier, displaying a preset entry of the preset page at a second preset display position in the preset control display region, wherein a display priority of the first preset display position is higher than a display priority of the second preset display position.

15. An electronic device, comprising:

at least one processor; and a storage apparatus, configured to storage at least one program, wherein the at least one program, when performed by the at least one processor, causes the at least one processor to:

display a target media work on a preset page of a current application, and the target media work is a work posted by a poster in the current application;

display a media content of the target media work, wherein the media content comprises a picture or a video;

in response to a trigger operation on the preset page displaying the target media work, determine at least one target media content from the media work;

in response to an emoji object generation instruction for the at least one target media content, generate at least one target emoji object according to the at least one target media content, wherein the at least one target emoji object is configured in an emoji selection interface of the current application; and wherein generating the at least one target emoji object comprises:

converting the at least one target media content to generate at least one target emoji object; and attribute information of the target media work is configured by a poster, and the attribute information is configured to indicate whether the media content of the target media work is allowed to be used to generate the target emoji object.

16. The device of claim 15, wherein the at least one program causing the at least one processor to determine at least one target media content from the media content comprises instructions to:

determine at least one selected media content as the at least one target media content in response to the selection operation for the media content.

17. The device according to claim 16, wherein the target media work comprises a target picture work; and the target picture work comprises at least one picture;

wherein the at least one program causing the at least one processor to display the media content of a target media work on a preset page of the current application comprises instructions to:

display the at least one picture in the target picture work on the preset page of the current application; and wherein the at least one program causing the at least one processor to determine the at least one selected media content as the at least one target media content in response to the selection operation for the media content comprises instructions to:

determine the at least one selected picture as at least one target picture in response to a selection operation for the at least one picture.

18. The device according to claim 15, wherein the at least one target picture work comprises a dynamic picture and/or a static picture.

19. The device according to claim 17, wherein the at least one program causing the at least one processor to generate the at least one target emoji object according to the at least one target media content comprises instructions to:

generate the at least one target emoji object according to the at least one target picture, wherein a single target emoji object comprises one or more target pictures among the at least one target picture.

20. A non-transitory storage medium comprising computer-executable instructions, wherein when executed by a computer processor, the computer-executable instructions cause the processor to:

display a target media work on a preset page of a current application, and the target media work is a work posted by a poster in the current application;

display a media content of the target media work, wherein the media content comprises a picture or a video;

in response to a trigger operation on the preset page displaying the target media work, determine at least one target media content from the media work;

in response to an emoji object generation instruction for the at least one target media content, generate at least one target emoji object according to the at least one target media content, wherein the at least one target emoji object is configured in an emoji selection interface of the current application; and wherein generating the at least one target emoji object comprises:

converting the at least one target media content to generate at least one target emoji object; and attribute information of the target media work is configured by a poster, and the attribute information is configured to indicate whether the media content of the target media work is allowed to be used to generate the target emoji object.

\* \* \* \* \*